US012704802B2

(12) United States Patent
Mitani et al.

(10) Patent No.: US 12,704,802 B2
(45) Date of Patent: Aug. 11, 2026

(54) HEATING DEVICE AND IMAGE FORMING APPARATUS

(71) Applicant: CANON KABUSHIKI KAISHA, Tokyo (JP)

(72) Inventors: Takanori Mitani, Kanagawa (JP); Satoshi Nishida, Kanagawa (JP); Isamu Takeda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/221,181

(22) Filed: May 28, 2025

(65) Prior Publication Data

US 2025/0291288 A1 Sep. 18, 2025

Related U.S. Application Data

(63) Continuation of application No. 18/504,049, filed on Nov. 7, 2023, now Pat. No. 12,346,043.

(30) Foreign Application Priority Data

Nov. 9, 2022 (JP) ................................ 2022-179270

(51) Int. Cl.
*G03G 15/20* (2006.01)

(52) U.S. Cl.
CPC ..... *G03G 15/2039* (2013.01); *G03G 15/2028* (2013.01); *G03G 15/2064* (2013.01); *G03G 2215/2035* (2013.01)

(58) Field of Classification Search
CPC .......... G03G 15/2039; G03G 15/2028; G03G 15/2064; G03G 2215/2035
See application file for complete search history.

(56) References Cited

U.S. PATENT DOCUMENTS

| | | | | |
|---|---|---|---|---|
| 6,157,776 | A * | 12/2000 | Onken ..................... | H05B 3/00 392/441 |
| 9,101,937 | B2 * | 8/2015 | Kitamura ................ | B01L 7/525 |
| 10,866,550 | B2 * | 12/2020 | Kawaguchi ........ | G03G 15/2053 |
| 11,402,774 | B2 * | 8/2022 | Imaizumi ........... | G03G 15/2025 |
| 11,609,521 | B1 * | 3/2023 | Miyashita .......... | G03G 15/2042 |
| 11,635,713 | B2 * | 4/2023 | Imaizumi ........... | G03G 15/2025 399/325 |
| 2017/0219969 | A1 * | 8/2017 | Umeda .............. | G03G 15/2039 |

(Continued)

*Primary Examiner* — Sevan A Aydin

(74) *Attorney, Agent, or Firm* — Canon U.S.A., Inc. IP Division

(57) ABSTRACT

A heating device includes a first rotating body, a heater, a temperature detection element, and a heater holder. The heater includes a heating element and a substrate on which the heating element is located. The temperature detection element is located on a second surface of the substrate opposite to a first surface of the substrate in a thickness direction of the substrate. The heater holder includes a reservoir portion configured to reserve grease to be supplied to between the first rotating body and the heater in a longitudinal direction of a longer side of the first surface of the substrate. A length of an area in the thickness direction of the reservoir portion overlapping an area where the temperature detection element is located is greater than a length of an area in the thickness direction of the reservoir portion not overlapping the area where the temperature detection element is located.

6 Claims, 6 Drawing Sheets

(56) References Cited

U.S. PATENT DOCUMENTS

| | | | | |
|---|---|---|---|---|
| 2018/0067432 | A1* | 3/2018 | Yamaguchi | G03G 15/2053 |
| 2019/0204765 | A1* | 7/2019 | Morimoto | G03G 15/2064 |
| 2020/0209788 | A1* | 7/2020 | Mochizuki | G03G 15/2039 |
| 2022/0404746 | A1* | 12/2022 | Maruyama | G03G 15/2039 |
| 2024/0134304 | A1* | 4/2024 | Nakazono | G03G 15/2025 |
| 2024/0280930 | A1* | 8/2024 | Sato | G03G 15/2039 |

* cited by examiner

HEATING DEVICE AND IMAGE FORMING APPARATUS

CROSS-REFERENCE TO RELATED APPLICATIONS

This application is a Continuation of co-pending U.S. patent application Ser. No. 18/504,049 filed Nov. 7, 2023, which claims priority benefit of Japanese Patent Application No. 2022-179270, filed Nov. 9, 2022, all of which are hereby incorporated by reference herein in their entireties.

BACKGROUND

Field

The present disclosure relates to a heating device, and more particularly, to a heating device used in an image forming apparatus such as an electrophotographic copying machine and a laser beam printer.

Description of the Related Art

A heating device of film heating type discussed in U.S. Pat. No. 5,525,775 has heretofore been known as a heating device used in an electrophotographic image forming apparatus. The heating device of film heating type includes a heater that includes a resistance heating element on a ceramic substrate, a fixing film that is heated and rotated in contact with the heater, and a pressure roller that forms a nip portion with the heater via the fixing film. The heating device of film heating type fixes an image to a recording material by heating and pressing the recording material at the nip portion. A temperature detection element is located on a side of the heater opposite to a side where the nip portion is formed, and detects the temperature of the heater.

As discussed in Japanese Patent Application Laid-Open No. H05-27619, a configuration in which a lubricant is interposed between a film and a heater has been known.

However, there are some heating devices of film heating type in which lubricant can hinder conduction of heat from a heater to a recording material and cause a drop in fixability.

SUMMARY

The present disclosure is directed to providing a unit that prevents a drop in fixability while maintaining slidability due to a lubricant.

According to an aspect of the present disclosure, a heating device includes a first rotating body, a heater that is long and includes a heating element and a substrate on which the heating element is located, wherein the heater is disposed in a space inside the first rotating body, a temperature detection element configured to detect temperature of the heater, and a heater holder configured to hold the heater, wherein, when a direction of a longer side of a first surface of the substrate where the heating element is located is designated as a longitudinal direction, a direction orthogonal to the longitudinal direction on the first surface is designated as a transverse direction, and a direction orthogonal to both the longitudinal and transverse directions is designated as a thickness direction, the temperature detection element is located on a second surface opposite to the first surface in the thickness direction, and the heater holder includes a reservoir portion configured to reserve grease to be supplied to between the first rotating body and the heater in the longitudinal direction, and wherein, when an area of the reservoir portion overlapping an area where the temperature detection element is located is designated as a first area, an area of the reservoir portion not overlapping the area where the temperature detection element is located is designated as a second area, a length of the first area in the thickness direction is a first length, and a length of the second area in the thickness direction is a second length, the first length is greater than the second length.

According to the present disclosure, a drop in fixability can be prevented while slidability due to a lubricant is maintained.

Further features of the present disclosure will become apparent from the following description of exemplary embodiments with reference to the attached drawings.

DESCRIPTION OF THE EMBODIMENTS

Exemplary embodiments of the present disclosure will be described with reference to the drawings. The following exemplary embodiments are not intended to limit the disclosure set forth in the claims, and all combinations of features described in the exemplary embodiments are not necessarily indispensable to the disclosure.

(Image Forming Apparatus)

Figure 1:
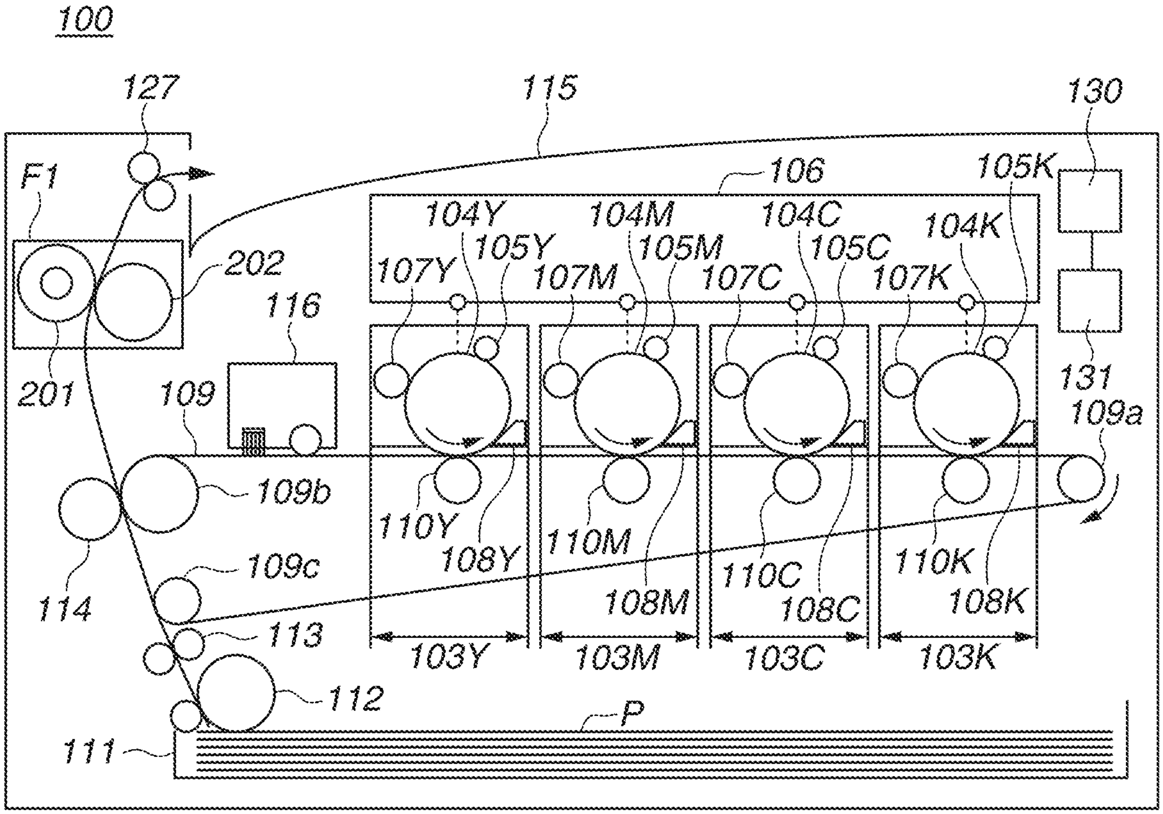
FIG. 1 is a schematic configuration diagram of an image forming apparatus.

An image forming apparatus 100 according to a first exemplary embodiment will be described. FIG. 1 is a schematic configuration diagram of the image forming apparatus 100 using an electrophotographic recording technique, used in the first exemplary embodiment. The image forming apparatus 100 includes four image forming stations 103Y, 103M, 103C, and 103K arranged in a substantially linear configuration. Of the four image forming stations 103Y, 103M, 103C, and 103K, the image forming station 103Y forms a yellow (Y) image, the image forming station 103M a magenta (M) image, the image forming station 103C a cyan (C) image, and the image forming station 103K a black (K) image. The image forming stations 103Y, 103M, 103C, and 103K include photosensitive drums 104Y, 104M, 104C, and 104K serving as image bearing members, and charging rollers 105Y, 105M, 105C, and 105K serving as charging units, respectively. The image forming stations 103Y, 103M, 103C, and 103K further include an exposure device 106 serving as an exposure unit, and developing devices 107Y, 107M, 107C, and 107K serving as developing units, respectively. The image forming stations 103Y, 103M, 103C, and 103K further include cleaning devices 108Y, 108M, 108C, and 108K serving as cleaning units, respectively.

A video controller 130 receives image information from an external apparatus (not illustrated) such as a host computer, and transmits a print signal to a control unit 131 such as a central processing unit (CPU), whereby an image forming operation is started. In forming an image, the image forming station 103Y rotates the photosensitive drum 104Y in the direction of the arrow in FIG. 1 by a not-illustrated rotation control unit (drive control unit) in response to a print command. The outer periphery (surface) of the photosensitive drum 104Y is initially uniformly charged by the charging roller 105Y. The exposure device 106 irradiates and exposes the charged surface of the photosensitive drum 104Y with laser light based on image data, whereby an electrostatic latent image is formed. The electrostatic latent image is visualized into a Y toner image by the developing device 107Y using Y toner. By such a process, a Y toner image is formed on the surface of the photosensitive drum 104Y. Similar image forming processes are performed in the image forming stations 103M, 103C, and 103K, whereby an M toner image is formed on the surface of the photosensitive drum 104M, a C toner image on the surface of the photosensitive drum 104C, and a K toner image on the surface of the photosensitive drum 104K.

An intermediate transfer belt 109 located along the direction of arrangement of the image forming stations 103Y, 103M, 103C, and 103K is stretched by a driving roller 109*a*, a driven roller 109*b*, and a driven roller 109*c*. The driving roller 109*a* is rotated in the direction of the arrow in FIG. 1 by the not-illustrated rotation control unit (drive control unit) in response to the print command. The intermediate transfer belt 109 is thereby moved to rotate at a predetermined process speed along the image forming stations 103Y, 103M, 103C, and 103K. Primary transfer rollers 110Y, 110M, 110C, and 110K are opposed to the photosensitive drums 104Y, 104M, 104C, and 104K with the intermediate transfer belt 109 therebetween. The primary transfer rollers 110Y, 110M, 110C and 110K successively transfer the respective color toner images to the outer periphery (surface) of the intermediate transfer belt 109 in a superposed manner. By such processes, a four-color full color toner image is formed on the surface of the intermediate transfer belt 109.

Transfer residual toner remaining on the surfaces of the photosensitive drums 104Y, 104M, 104C, and 104K after the primary transfer is removed by not-illustrated cleaning blades included in the cleaning devices 108Y, 108M, 108C, and 108K. This makes the photosensitive drums 104Y, 104M, 104C, and 104K ready to form a next image. The photosensitive drums 104, the charging rollers 105, the developing devices 107, and the primary transfer rollers 110 described above and a not-illustrated scanner unit are included an image forming unit for forming an unfixed image on a recording material P.

Recording materials P stacked and accommodated in a feed cassette 111 located in a lower part of the image forming apparatus 100 are separated and fed from the feed cassette 111 one by one by a feed roller 112, and fed to a registration roller pair 113. The registration roller pair 113 sends the fed recording material P to a transfer nip portion between the intermediate transfer belt 109 and a secondary transfer roller 114.

The secondary transfer roller 114 is opposed to the driven roller 109*b* with the intermediate transfer belt 109 therebetween. A bias is applied to the secondary transfer roller 114 from a not-illustrated high-voltage power supply when the recording material P passes through the transfer nip portion. The full color toner image is thereby secondarily transferred from the surface of the intermediate transfer belt 109 to the recording material P passing through the transfer nip portion.

The recording material P bearing the toner thereon is conveyed to a fixing device F1 including a heating member 202 and a pressure roller 201 serving as a pressure member. The recording material P is then heated and pressed with heat from a heater in the fixing device F1 serving as a heating device, whereby the toner image is thermally fixed to the recording material P. The recording material P is discharged from the fixing device F1 to a discharge tray 115 outside the image forming apparatus 100 by a discharge roller 127. Transfer residual toner remaining on the surface of the intermediate transfer belt 109 after the secondary transfer is removed by an intermediate transfer belt cleaning device 116. This makes the intermediate transfer belt 109 ready to form a next image.

The foregoing image forming apparatus 100 is described by using a tandem color laser printer that forms an image by transferring two or more color toners to a recording material via an intermediate transfer belt as a representative example. However, the application of the present exemplary embodiment is not limited to the example. The image forming apparatus 100 may be of direct transfer type where two or more color toners are directly transferred to a recording material. The present exemplary embodiment can also be applied to a monochrome laser printer using monochrome toner.

Figure 2:
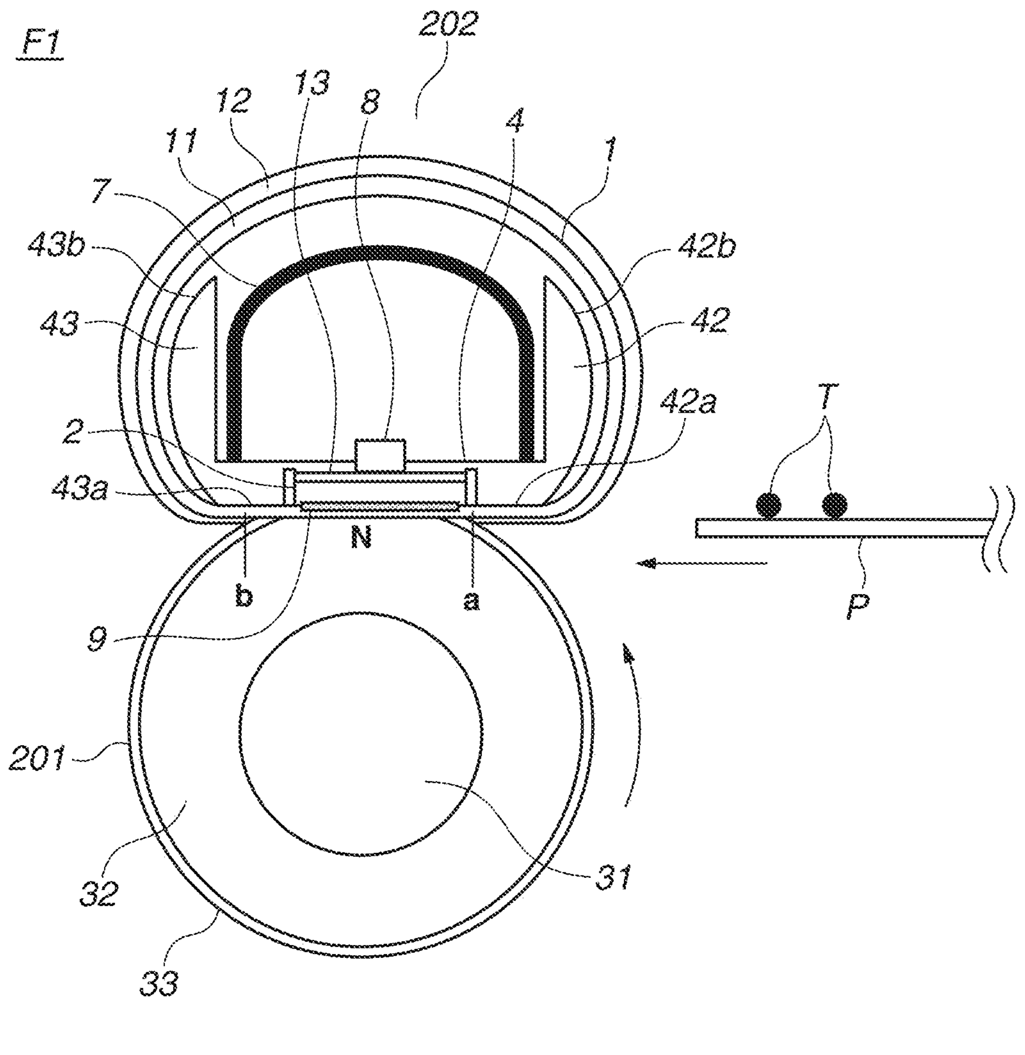
FIG. 2 is a schematic configuration diagram of a fixing device.

FIG. 2 is a schematic configuration diagram of the fixing device F1. The fixing device F1 includes a flexible fixing film 1 serving as a first rotating body, a heater 2 located in the space inside the fixing film 1, and a pressure roller 201 serving as a second rotating body that forms a nip portion N with the heater 2 via the fixing film 1. In FIG. 2, the direction of the longer side of the long heater 2 may be referred to as a longitudinal direction (near-to-far direction in FIG. 2), and the direction of the shorter side of the heater 2 orthogonal to the longitudinal direction may be referred to as a transverse direction (lateral direction in FIG. 2). The direction of the thickness of the heater 2 orthogonal to the longitudinal and transverse directions may be referred to as a thickness direction (vertical direction in FIG. 2).

The heater 2 is held by a heater holder 4 serving as a holding member via an isothermal member 13. A temperature detection element 8 such as a thermistor is disposed on the side of the heater 2 opposite to the nip portion N in the thickness direction via the isothermal member 13. The temperature detection element 8 is in contact with the heater holder 4 and detects the temperature of the heater 2 via the isothermal member 13. The isothermal member 13 is made of a material having high heat conductivity, such as metal and a graphite sheet, so that longitudinal thermal unevenness can be reduced. In the present exemplary embodiment, the isothermal member 13 is a 300-μm-thick aluminum plate. The temperature detection element 8 may be configured to directly contact the heater 2 without the isothermal member 13. The recording material P on which the toner image is formed is sandwiched and conveyed by the nip portion N and heated by the heater 2 to which power based on the temperature detected by the temperature detection element 8 is supplied.

The fixing film 1 is driven to rotate by the rotation of the pressure roller 201 in the direction of the arrow in the diagram. The fixing film 1 slides at the contact surface with the heater 2 and is driven to rotate by the rotation of the pressure roller 201 at the contact surface with the pressure roller 201.

The heater holder 4 is located in the space inside the fixing film 1, and holds the heater 2. The heater holder 4 includes a guide portion that contacts the fixing film 1 to guide the rotation of the fixing film 1. A pressure stay 7 is located in the space inside the fixing film 1, and supports the heater holder 4 so that the heater holder 4 is pressed against the pressure roller 201.

To make the fixing film 1 and the heater 2 slidable, lubricating grease 9 serving as a lubricant is applied to the side of the heater 2 where the fixing film 1 slides. With the gap between the sliding surfaces of the fixing film 1 and the heater 2 as a sliding portion, the lubricating grease 9 adheres to the inner periphery of the fixing film 1 and circulates from the downstream end of the sliding portion to the upstream end of the sliding portion in the direction of rotation of the fixing film 1. While the fixing film 1 is described to slide on the heater 2 as an example, this is not restrictive. For example, a sliding plate may be disposed between the heater 2 and the fixing film 1. In such a configuration, the lubricating grease 9 is applied to between the sliding plate and the fixing film 1.

The fixing film 1 has a two-layer structure including a base layer 11 and a surface layer 12. The base layer 11 is in charge of mechanical properties of the fixing film 1, such as torsional strength and smoothness. The base layer 11 is made of a resin such as polyimide, or a high heat conductive metal or alloy such as stainless steel (SUS). The surface layer 12 is formed of perfluoroalkoxy alkane (PFA) or polytetrafluoroethylene (PTFE) having high releasability to reduce adhesion of toner or paper dust. An elastic layer made of silicone rubber may be disposed between the base layer 11 and the surface layer 12 for improved followability to the recording material P. The fixing film 1 has an outer diameter of φ18 and a longitudinal length of 233 mm. The base layer 11 is a 60-μm-thick polyimide layer. The surface layer 12 includes a 12-μm releasing layer formed by PFA coating.

The heater 2 includes a substrate long in the longitudinal direction. An insulating ceramic substrate of alumina or aluminum nitride, or a heat-resistant resin substrate of polyimide, polyphenylene sulfide (PPS), or liquid crystal polymers is used as the substrate. A silver-palladium (Ag/Pd) electric heating resistor layer (hereinafter, also referred to as a heating element) is applied and formed on a first surface of the substrate in the form of lines or narrow bands by screen printing. To protect and insulate the heating element, an insulating protective layer of, e.g., glass or polyimide resin is formed on the substrate to cover the heating element. The temperature detection element 8 such as a thermistor is located on a second surface of the substrate opposite to the first surface where the heating element is located in the thickness direction. The control unit 131 controls the power supplied to the heater 2 based on the temperature detected by the temperature detection element 8.

Alumina is used as the substrate material of the heater 2 according to the present exemplary embodiment, and the heater 2 includes an Ag/Pd heating element with a glass coating as the insulating protective layer. The heating element has a resistance of 19Ω. The substrate has a size of 5.83 mm in transverse width, 270 mm in longitudinal length, and 1 mm in thickness. A thermistor is used as the temperature detection element 8. The power supply is controlled so that the temperature detected by the thermistor is 220° C. while a sheet is passing.

While alumina is used as an example of the substrate material, the substrate material is not limited to alumina. For example, the substrate may be formed of a heat conductive material such as metal, coated with an insulating member. The protective layer of the substrate, or protective coating layer, is made of a heat-resistant material like glass or a resin such as polyimide and fluorine resin, and protects the heating element and provides dielectric strength. The protective coating layer is a 60-μm-thick glass layer. A slide coating layer is formed of glass or a resin such as polyimide and fluorine resin, and intended to provide slidability and wear resistance against the inner surface of the fixing film 1. The slide coating layer is a 30-μm-thick glass layer. The heating element is formed by applying an electrical resistance material such as silver and palladium in a thickness of about several tens of micrometers by screen printing.

The pressure roller 201 serving as a pressure member includes a core 31 of iron or aluminum, an elastic layer 32 of silicone rubber, and a releasing layer 33 of PFA. To satisfy a nip width and durability for satisfactory fixability, the pressure roller 201 desirably has a hardness of 30 to 60 points with a load of 600 gf under an Asker durometer type C.

In the present exemplary embodiment, a φ11 iron core is used as the core 31. For heat insulation, a 3.5-mm-thick sponge-like foamed silicone rubber layer is formed as the elastic layer 32, which is coated with a 20-μm-thick conductive PFA tube. The pressure roller 201 has a hardness of 45 points and an outer diameter of φ18. The elastic layer 32 has a longitudinal length of 225 mm. The pressure roller 201 is rotated by the rotation of a not-illustrated fixing motor.

The heater holder 4 serving as a holding member maintains the orientation of the fixing film 1 and holds the heater 2. Because the heater holder 4 slides against the fixing film 1, the heater holder 4 is desirably molded of a heat-resistant material having excellent slidability, such as liquid crystal polymers, PPS, and polyethylene terephthalate (PET).

The heater holder 4 is a long member having a gutter-shaped cross section, and has a fitting recess for holding the heater 2 on a side close to the nip portion N. The heater holder 4 includes an upstream guide portion 42 and a downstream guide portion 43 that contact the inner periphery of the fixing film 1 to guide the rotation of the fixing film 1, upstream and downstream of the heater 2, respectively. The upstream and downstream guide portions 42 and 43 include sliding portions **42*a* and 43*a* that adjoin the heater 2 and are located substantially flush with the surface of the heater 2 to contact the inner periphery of the fixing film 1. The upstream and downstream guide portions 42 and 43 also include guide rib portions 42*b* and 43*b* that contact the inner periphery of the fixing film 1 when the fixing film 1** starts to rotate.

In the present exemplary embodiment, a part of the sliding portion **43*a* is included within the nip portion N in the conveyance direction of the recording material P. This increases the contact pressure between the sliding portion 43*a* and the fixing film 1, whereby the lubricating grease 9 adhering to the inner surface of the fixing film 1 can be scraped off by the downstream guide portion 43. As illustrated in FIG. 3, more than one guide rib portion 42*b* and more than one guide rib portion 43*b*** are arranged in the longitudinal direction.

The heater holder 4 is engaged with the pressure stay 7 both longitudinal ends of which are held by a device frame. The pressure stay 7 is a long member having a U-shaped cross section, and fitted into the fitting recess of the heater holder 4 opposite to the nip portion N with the open side down. Both longitudinal ends of the pressure stay 7 are pressed by not-illustrated pressure springs, whereby the heater holder 4 is pressed against the pressure roller 201 via the heater 2 and the fixing film 1.

To convey the pressing force received at both longitudinal ends substantially uniformly over the longitudinal direction of the heater holder 4, the pressure stay 7 is formed of a rigid material such as iron, stainless steel, and zinc-coated steel, with a U-shaped cross section for enhanced rigidity. This can reduce warpage of the heater holder 4, and a nip portion N of substantially uniform, predetermined width (between points a and b) can be formed in the longitudinal direction.

The heater holder 4 is made of liquid crystal polymers, and the pressure stay 7 a zinc-coated steel sheet. The pressing force applied to the pressure roller 201 is 13.5 kgf, in which case the nip portion N has a width (distance between points a and b) of 7 mm. Heat-resistant fluorine grease is used as the lubricating grease 9. To sufficiently lubricate the fixing film 1 against the heater 2 and the heater holder 4, the lubricating grease 9 is applied to the surface of the heater 2. As the fixing film 1 rotates, the lubricating grease 9 spreads over the inner surface of the fixing film 1 to lubricate the fixing film 1. To ensure slidability throughout the product life, the amount of application of the lubricating grease 9 is desirably 100 mg to 800 mg.

In the present exemplary embodiment, the product life is equivalent to a period for which 300,000 sheets pass. Fluorine grease containing perfluoropolyether (PFPE) base oil and a PTFE thickener, with a specific gravity of 2.2 g/cm$^3$ is used. 230 mg of fluorine grease is applied to an area of 192 mm in longitudinal length and 5 mm in transverse width on the surface of the heater 2.

The heater holder 4 has a groove serving as a reservoir portion for reserving the lubricating grease 9. The groove is a space surrounded by the heater 2, the heater holder 4, the isothermal member 13, and the fixing film 1, and located downstream in the conveyance direction of the recording material P. This space will also be referred to as a lubricant retaining space V. Here, the lubricant retaining space V is formed as a longitudinal groove, for example.

Figure 3A:
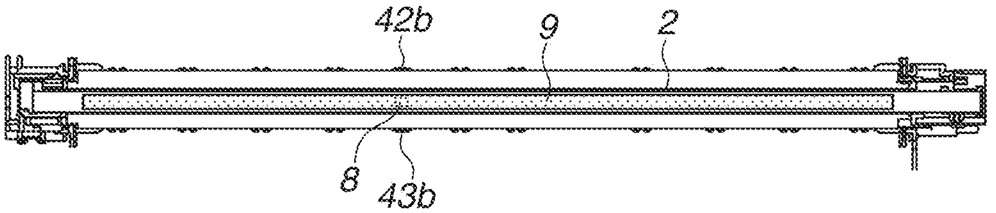
FIGS. 3A to 3E are diagrams illustrating a lubricant retaining space of the fixing device.
Figure 3B:
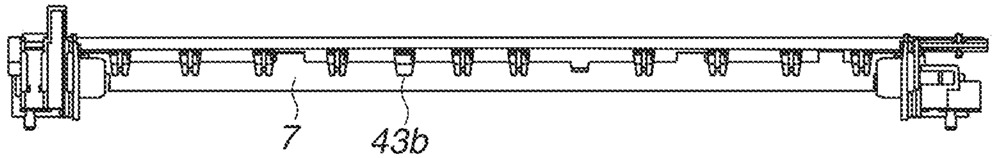
Figure 3C:
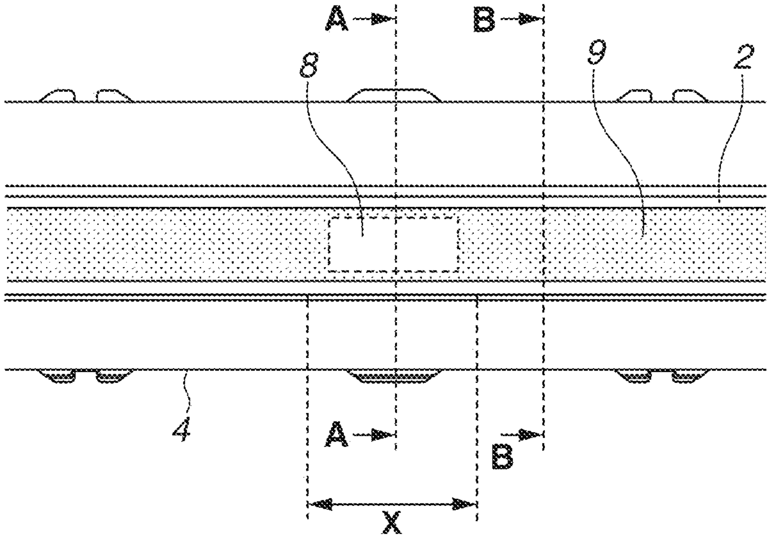
Figure 3D:
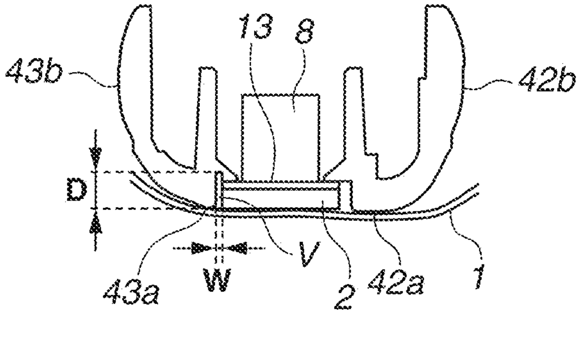
Figure 3E:
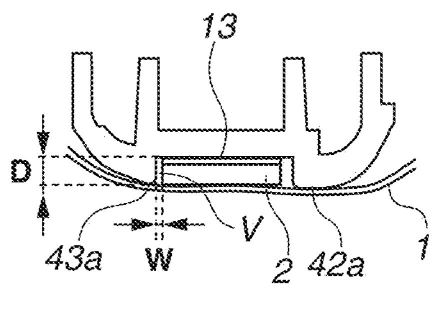

FIGS. 3A to 3E illustrate the lubricant retaining space V of the fixing device F1. FIG. 3A is a view of the heater 2 and the heater holder 4 seen from the pressure roller 201. FIG. 3B is a view of the heater holder 4 seen from a downstream side in the conveyance direction of the recording material P. FIG. 3C is an enlarged view of the area where the temperature detection element 8 is located in FIG. 3A. FIG. 3D is a sectional view of the area where the temperature detection element 8 is longitudinally arranged, seen in the transverse direction and taken along the broken line A-A. FIG. 3E is a sectional view of an area where the temperature detection element 8 is not longitudinally arranged, seen in the transverse direction and taken along the broken line B-B.

In the present exemplary embodiment, as illustrated in FIGS. 3D and 3E, the cross sections of the lubricant retaining space V seen in the transverse direction are substantially rectangular. The transverse length of the lubricant retaining space V will be referred to as a width W, and the length in the thickness direction as a depth D. As illustrated in FIGS. 3D and 3E, a first area of the lubricant retaining space v corresponding to the area where the temperature detection element 8 is longitudinally arranged has a cross-sectional area greater than that of a second area corresponding to the area where the temperature detection element 8 is not arranged.

The longitudinal area where the lubricant retaining space V has the greater cross-sectional area will be referred to as an enhanced retaining area X. As illustrated in FIG. 3C, the enhanced retaining area X corresponds to the area where the temperature detection element 8 is located in the transverse direction. The width W of the enhanced retaining area X in the transverse direction is 30 μm. The depth D of the enhanced retaining area X in the thickness direction is 180 μm.

The width W of the lubricant retaining space V other than the enhanced retaining area X in the transverse direction is 30 μm, and the depth D in the thickness direction is 130 μm. In other words, the lubricant retaining space V has a cross-sectional area of approximately 5400 μm$^2$ in the enhanced retaining area X, and approximately 3900 μm$^2$ in the areas other than the enhanced retaining area X.

Suppose that the applied lubricating grease 9 is uniformly distributed in the longitudinal direction of the fixing film 1. In such a case, the lubricating grease 9 occupies a cross-sectional area of 4487 μm$^2$. This cross-sectional area is calculated by the following expression: 230 mg (the total amount of lubricating grease 9)÷2.2 g/cm$^3$ (the specific gravity of the lubricating grease 9)÷233 mm (the longitudinal length of the fixing film 1)×10000. The cross-sectional area of the lubricant retaining space V in the areas other than the enhanced retaining area X is desirably at a ratio of 50% to 100% with respect to the cross-sectional area that the lubricating grease 9 occupies if the applied lubricating grease 9 is assumed to be uniformly distributed over the longitudinal length of the fixing film 1. If the ratio is too low, the lubricating grease 9 overflows from the lubricant retaining space V to between the heater 2 and the fixing film 1 so much that the fixability can drop. On the other hand, if the ratio is too high, the lubricating grease 9 retained in the lubricant retaining space V is less likely to be supplied to between the heater 2 and the fixing film 1 and a slip can occur easily in a later stage of the life.

In the present exemplary embodiment, the longitudinal length of the enhanced retaining area X is 12 mm. The longitudinal width of the enhanced retaining area X is suitably 5 to 80 mm or so. If the length is smaller than 5 mm, the lubricating grease 9 overflows from the lubricant retaining space V to between the heater 2 and the fixing film 1 so much that the fixability can drop. If the length is greater than 80 mm, the lubricating grease 9 retained in the lubricant retaining space V is less likely to be supplied to between the heater 2 and the fixing film 1 and a slip can occur easily. In the present exemplary embodiment, the enhanced retaining area X is configured to correspond to the area where the temperature detection element 8 is located in the transverse direction. In other words, the temperature detection element 8 overlaps the entire enhanced retaining area X in the transverse direction. However, the configuration is not limited to the described example. For example, the temperature detection element 8 may be located to partly overlap the enhanced retaining area X in the transverse direction.

The guide rib portions 42*b* and 43*b* serving as first guide portions located at positions overlapping the enhanced retaining area X in the transverse direction have a cross-sectional area of a first value. The guide rib portions 42*b* and 43*b* serving as second guide portions located at positions not overlapping the enhanced retaining area X in the transverse direction have a cross-sectional area of a second value. The first guide portions have a cross-sectional area greater than that of the second guide portions. The length of the first guide portions in the thickness direction is greater than that of the second guide portions in the thickness direction. The reason is to compensate for a relative drop in the strength of the heater holder 4 due to the increased depth D of the enhanced retaining area X in the thickness direction by the guide rib portions 42*b* and 43*b*. This can secure the strength of the heater holder 4 and prevent uneven temperature increases in the longitudinal direction of the heater 2 due to the nonuniform thermal capacity of the heater holder 4 in the longitudinal direction.

As the fixing film 1 rotates, the lubricating grease 9 applied to the heater 2 also adheres to the inner periphery of the fixing film 1. However, the amount of lubricating grease 9 adhering to the inner periphery of the fixing film 1 is relatively small, and most of the lubricating grease 9 adheres to the surface of the heater 2. The lubricating grease 9 adhering to the inner periphery of the fixing film 1 is scraped off by the downstream guide portion 43 and retained in the lubricant retaining space V. Each time the fixing film 1 rotates, the lubricating grease 9 adhering to the inner periphery of the fixing film 1 is retained into the lubricant retaining space V. If the lubricant retaining space V is filled with the lubricating grease 9, the lubricating grease 9 is gradually supplied from the lubricant retaining space V to the heater 2 as the fixing film 1 rotates.

In the present exemplary embodiment, the lubricant retaining space V corresponding to the area where the temperature detection element 8 is located is configured as the enhanced retaining area X. This relatively reduces the amount of lubricating grease 9 applied to the area of the heater 2 corresponding to the area where the temperature detection element 8 is located, as compared to the other portions. The smaller the amount of lubricating grease 9, the more easily the heat of the heater 2 is conducted to the fixing film 1 and the smaller the discrepancy between the temperature detected by the temperature detection element 8 and the power submitted to the heater 2 is. This can prevent a drop in the fixability due to a decrease in the power supplied to the heater 2. In the areas other than the enhanced retaining area X, a relatively large amount of lubricating grease 9 is supplied to the heater 2. The heater 2 and the fixing film 1 can thus be sufficiently lubricated as well.

In the present exemplary embodiment, the amount of lubricating grease 9 retained in the area of the lubricant retaining space V corresponding to the area where the temperature detection element 8 is located is relatively increased as compared to the other areas of the lubricant retaining space V. Because the amount of lubricating grease 9 adhering to the inner periphery of the fixing film 1 corresponding to the area where the temperature detection element 8 is located can thereby be made relatively small, a drop in the fixability can be prevented while the heater 2 and the fixing film 1 are sufficiently lubricated. In particular, even in an initial state where the lubricating grease 9 is applied to the heater 2 immediately after assembly, the amount of lubricating grease 9 adhering to the inner periphery of the fixing film 1 corresponding to the area where the temperature detection element 8 is located can be made relatively small. This can sufficiently lubricate the heater 2 and the fixing film 1 and prevent a drop in the fixability even in the initial state.

[Evaluation Tests]

Figure 4A:
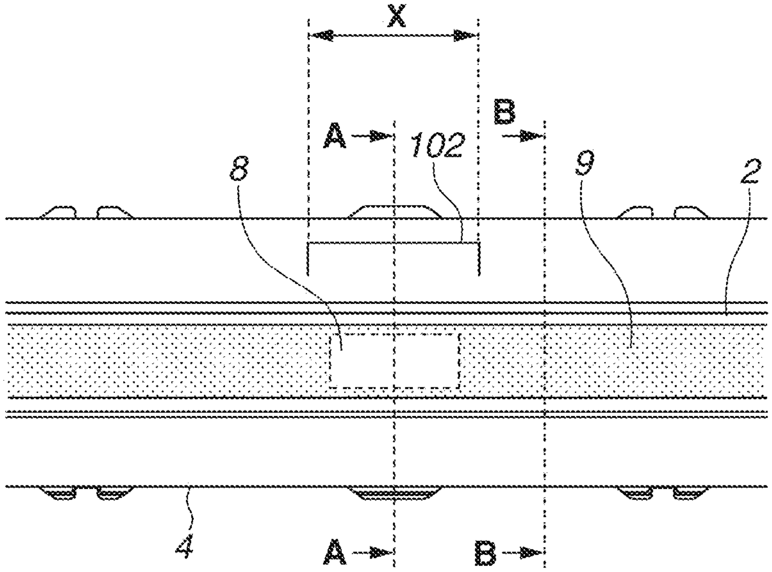
FIGS. 4A to 4C are diagrams illustrating a fixing device of a comparative example.
Figure 4B:
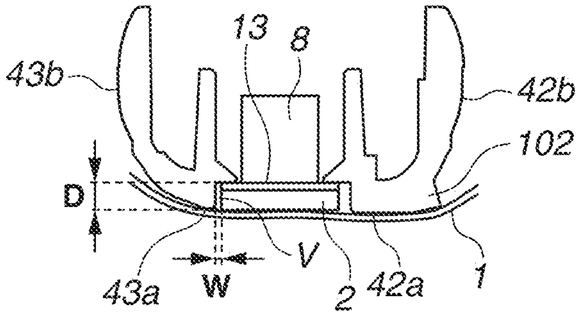
Figure 4C:
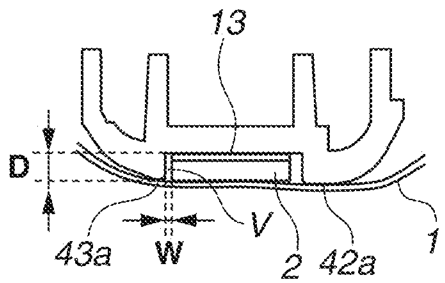

The fixing device F1 was subjected to a fixability evaluation test immediately after assembly, a slip evaluation test after an extended period of sheet passing, and a gloss uniformity evaluation test after an extended period of sheet passing. Fixing devices according to the present exemplary embodiment and three comparative examples were prepared for the evaluation tests. In a first comparative example, the lubricant retaining space V had a width W of 30 μm and a depth D of 130 μm over the entire longitudinal area. In a second comparative example, the lubricant retaining space V had a width W of 30 μm and a depth D of 180 μm over the entire longitudinal area. In a third comparative example, as illustrated in FIGS. 4A to 4C, a grease regulation rib 102 was disposed on the guide rib portion 42*b* at a position corresponding to the area where the temperature detection element 8 was located in addition to the configuration of the first comparative example.

The fixability was evaluated in a low-temperature low-humidity (L/L) environment (15° C. in temperature, 10% in humidity) under a condition that a voltage of 120 V was applied to the heater 2 and 100 images were formed on Letter-sized sheets of plain paper (75 g/m$^2$ in grammage) at a process speed of 170 mm/sec. The fixability was evaluated to be OK if no exfoliation was observed in the toner images. The fixability was evaluated to be no good if any toner image was found to exfoliate. The integrated electrical energy submitted to the heater 2 during the passing of 100 recording materials was also measured.

The slip evaluation was conducted to check the slidability of the fixing film 1. The fixing device F1 after 50000 sheets passed was evaluated in a high-temperature high-humidity (H/H) environment (30° C. in temperature, 80% in humidity) under a condition that 10 images were formed on Letter-sized sheets of plain paper (75 g/m$^2$ in grammage) at a process speed of 170 mm/sec. The slip was evaluated to be OK if 10 sheets successfully passed through the fixing device F1. The slip was evaluated to be no good if the fixing device F1 jammed. Table 1 illustrates the evaluations.

The fixing device F1 after passing of 300000 sheets was evaluated for gloss uniformity in a normal-temperature normal-humidity (N/N) environment (23° C. in temperature, 50% in humidity) under a condition that 10 images were formed on Letter-sized sheets of glossy paper (75 g/m$^2$ in grammage) at a process speed of 45 mm/sec. The gloss uniformity was evaluated to be OK if no uneven gloss was visually observed in the toner images. The gloss uniformity was evaluated to be no good if uneven gloss was visually observed in any of the toner images. Table 1 illustrates the evaluations.

TABLE 1

| | Integrated electrical energy after passing of 100 sheets | Fixability | Slip | Gloss uniformity |
|---|---|---|---|---|
| First exemplary embodiment | 25.7 Wh | OK | OK | OK |
| First comparative example | 24.0 Wh | No good | OK | OK |
| Second comparative example | 25.5 Wh | OK | No good | OK |
| Third comparative example | 25.7 Wh | OK | OK | No good |

As illustrated in Table 1, in the first comparative example, the slip was evaluated to be OK, whereas the integrated electrical energy submitted to the heater 2 was low and the fixability was no good. The reason why the fixability was no good is that the lubricant retaining space V was narrow over the entire longitudinal area, and a large amount of lubricating grease 9 that failed to be retained in the lubricant retaining space V overflowed and adhered to the surface of the heater 2. This increased the difference between the temperature detected by the temperature detection element 8 and the temperature of the nip portion.

In the second comparative example, the lubricant retaining space V was large over the entire longitudinal area and the fixability was evaluated to be OK, whereas the slip was evaluated to be no good. The reason why the slip was evaluated to be no good is that the large lubricant retaining space V over the entire longitudinal area retained a large amount of lubricating grease 9. The amount of lubricating grease 9 adhering to the inner periphery of the fixing film 1 after the extended period of sheet passing was thus small, and the slidability between the fixing film 1 and the heater 2 dropped.

In the third comparative example, the lubricating grease 9 adhering to the inner periphery of the fixing film 1 corresponding to the area where the temperature detection element 8 was located was scraped off by the grease regulation rib 102. As a result, both the fixability and the slip were evaluated to be OK, whereas the gloss uniformity was evaluated to be no good. The reason why the gloss uniformity was evaluated to be no good is that the area of the fixing film 1 contacting the grease regulation rib 102 was worn thin during the extended period of sheet passing compared to the other areas, and heat was longitudinally unevenly conducted to the toner images T on the recording materials P.

In the present exemplary embodiment, the enhanced retaining area X of the lubricant retaining space V can relatively reduce the lubricating grease 9 on the surface of the heater 2 corresponding to the area where the temperature detection element 8 is located. As a result, the difference between the temperature detected by the temperature detection element 8 and the temperature of the nip portion can be made smaller than in the first comparative example. The fixability can thus be maintained high and results in OK. The amount of lubricating grease 9 retained in the lubricant retaining space V other than the area corresponding to the area where the temperature detection element 8 is located is relatively smaller than that in the enhanced retaining area X. In other words, a relatively large amount of lubricating grease 9 adheres to the surface of the heater 2. This lubricating grease 9 functions as a lubricant between the fixing film 1 and the heater 2, and the slip is OK. Unlike the third comparative example, there is no configuration where a member locally contacts the fixing film 1 to scrape off the lubricating grease 9. The fixing film 1 can thus be prevented from local abrasion, and the gloss uniformity is OK.

Configuring the lubricant retaining space V corresponding to the area where the temperature detection element 8 is located into the enhanced retaining area X can thus prevent a drop in the fixability while maintaining the slidability due to the lubricant.

In a second exemplary embodiment, a configuration where the transverse width of the heater holder 4 is increased to increase the amount of lubricating grease 9 retained in the enhanced retaining area X of the lubricant retaining space V will be described.

Similar configurations to those of the foregoing first exemplary embodiment, including the image forming apparatus 100, will be denoted by the same reference numerals. A detailed description thereof will be omitted.

Figure 5A:
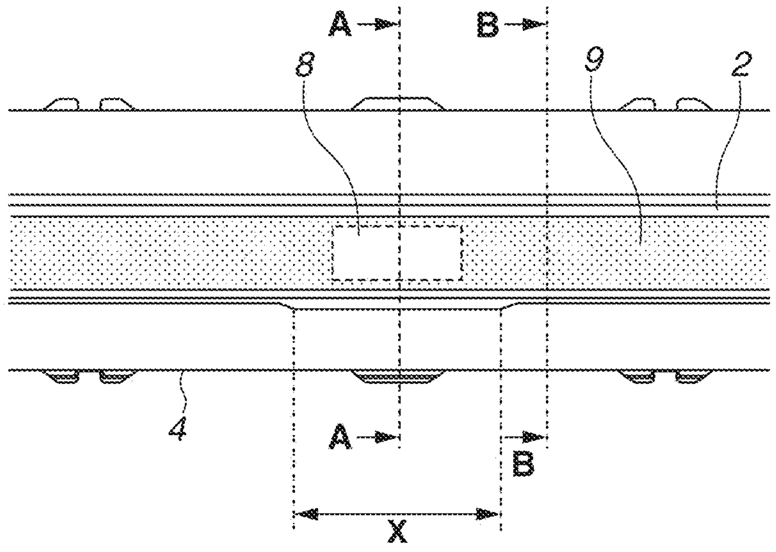
FIGS. 5A to 5C are diagrams illustrating the lubricant retaining space of a fixing device.
Figure 5B:
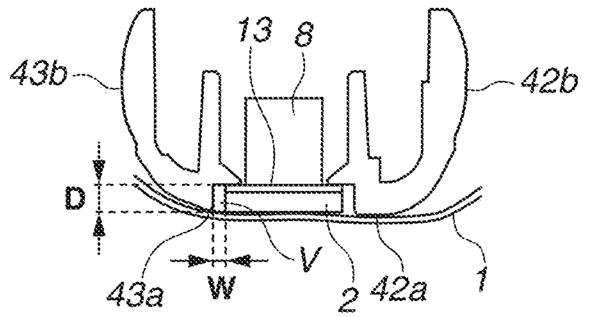
Figure 5C:
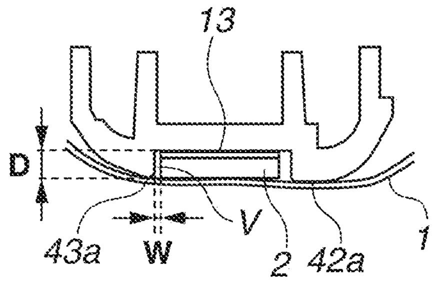

As illustrated in FIGS. 5A to 5C, the depth D of the lubricant retaining space V in the thickness direction is 130 μm over the entire longitudinal area. The transverse width W of the lubricant retaining space V is 60 μm in the enhanced retaining area X, and 30 μm in the areas other than the enhanced retaining area X. The longitudinal length of the enhanced retaining area X is 12 mm.

Increasing the transverse width W of the enhanced retaining area X of the lubricant retaining space V reduces the viscous resistance of the lubricating grease 9, whereby the lubricating grease 9 adhering to the inner periphery of the fixing film 1 can be more efficiently scraped off and retained.

Evaluation tests similar to those of the foregoing first exemplary embodiment were conducted on the fixing device F1 according to the present exemplary embodiment. Table 2 illustrates the results.

TABLE 2

| | Integrated electrical energy after passing of 100 sheets | Fixability | Slip | Gloss uniformity |
|---|---|---|---|---|
| Second exemplary embodiment | 26.1 Wh | OK | OK | OK |

As illustrated in Table 2, in the present exemplary embodiment, the lubricating grease 9 on the surface of the heater 2 corresponding to the area where the temperature detection element 8 is located can be relatively reduced by the enhanced retaining area X of the lubricant retaining space V. Because the difference between the temperature detected by the temperature detection element 8 and the temperature of the nip portion can thus be made smaller than that in the first comparative example, the fixability can be maintained high and results in OK. The amount of lubricating grease 9 retained in the lubricant retaining space V other than the area corresponding to the area where the temperature detection element 8 is located is relatively smaller than that in the enhanced retaining area X. In other words, a relatively large amount of lubricating grease 9 adheres to the surface of the heater 2. This lubricating grease 9 functions as a lubricant between the fixing film 1 and the heater 2, and the slip is OK. Unlike the third comparative example, there is no configuration where a member locally contacts the fixing film 1 to scrape off the lubricating grease 9. The fixing film 1 can thus be prevented from local abrasion, and the gloss uniformity is OK.

Configuring the lubricant retaining space V corresponding to the area where the temperature detection element 8 is located into the enhanced retaining area X can thus prevent a drop in the fixability while maintaining the slidability due to the lubricant.

Figure 6:
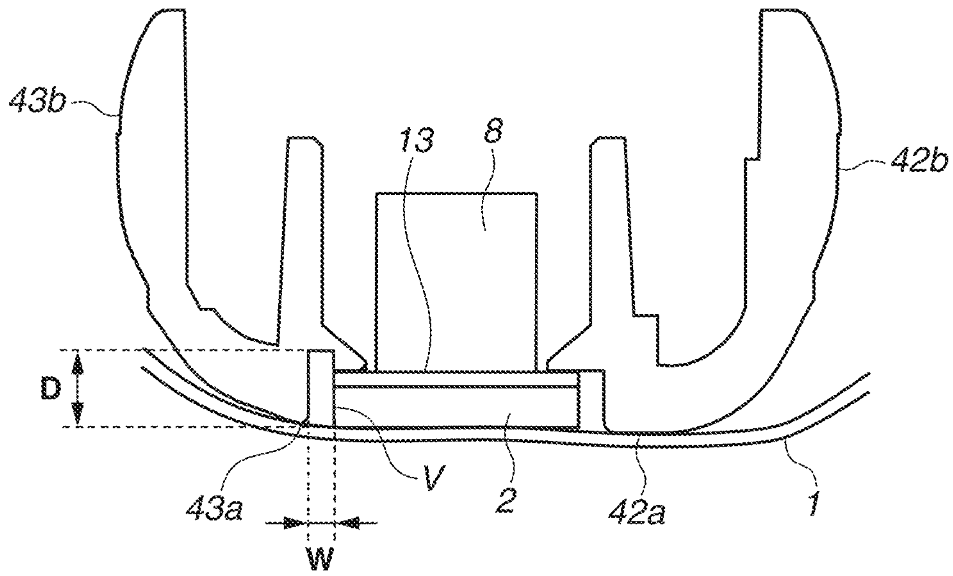
FIG. 6 is a diagram illustrating the lubricating retaining space of a fixing device.

A third exemplary embodiment will be described. In the first exemplary embodiment, the enhanced retaining area X of the lubricant retaining space V is described to be increased in the depth D in the thickness direction. In the second exemplary embodiment, the enhanced retaining area X of the lubricant retaining space V is described to be increased in the transverse width W. As illustrated in FIG. 6, the enhanced retaining area X may be increased in both the depth D and the width W. Configuring the lubricant retaining space V corresponding to the area where the temperature detection element 8 is located into the enhanced retaining area X can prevent a drop in the fixability while maintaining the slidability due to the lubricant.

In the first to third exemplary embodiments, the lubricant retaining space V is described to be a groove formed in the heater holder 4 downstream in the conveyance direction of the recording material P. However, this is not restrictive. For example, a groove may be formed in the heater holder 4 upstream in the conveyance direction of the recording material P. Even in such a case, the portion corresponding to the area where the temperature detection element 8 is located is configured into an enhanced retaining area X, whereby a drop in the fixability can be prevented while the slidability due to the lubricant is maintained.

Examples of Configurations or Concepts Disclosed in Exemplary Embodiments

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A heating device comprising:

a first rotating body;

a heater that is long and includes a heating element and a substrate on which the heating element is located, wherein the heater is disposed in a space inside the first rotating body;

a temperature detection element configured to detect temperature of the heater; and a heater holder configured to hold the heater, wherein, when a direction of a longer side of a first surface of the substrate where the heating element is located is designated as a longitudinal direction, a direction orthogonal to the longitudinal direction on the first surface is designated as a transverse direction, and a direction orthogonal to both the longitudinal and transverse directions is designated as a thickness direction, the temperature detection element is located on a second surface opposite to the first surface in the thickness direction, and the heater holder includes a reservoir portion configured to reserve grease to be supplied to between the first rotating body and the heater in the longitudinal direction, and wherein, when an area of the reservoir portion overlapping, in the longitudinal direction, an area where the temperature detection element is located is designated as a first area, and an area of the reservoir portion not overlapping, in the longitudinal direction, the area where the temperature detection element is located is designated as a second area, a cross-sectional area of the reservoir portion in a virtual surface that is perpendicular to the longitudinal direction and passes through the first area is larger than a cross-sectional area of the reservoir portion in a virtual surface that is perpendicular to the longitudinal direction and passes through the second area.

2. The heating device according to claim 1, wherein a length of the first area in the transverse direction is greater than a length of the second area in the transverse direction.

3. The heating device according to claim 1, wherein the heater holder includes a guide portion configured to guide rotation of the first rotating body, wherein, when the guide portion includes a first guide portion overlapping, in the transverse direction, the area where the temperature detection element is located and a second guide portion not overlapping, in the transverse direction, the area where the temperature detection element is located, a length of the first guide portion in the thickness direction is greater than a length of the second guide portion in the thickness direction.

4. The heating device according to claim 1, further comprising a second rotating body configured to form a nip portion with the heater via the first rotating body, wherein the heater is configured to heat and fix an image formed on a recording material at the nip portion.

5. The heating device according to claim 4, wherein the first rotating body is a film within which is the space inside the first rotating body, wherein the second rotating body is a pressure roller, and wherein the heater is located in the space inside the film, the heater and the pressure roller are configured to hold the film between the heater and the pressure roller, and the image formed on the recording material is heated at the nip portion via the film.

6. An image forming apparatus comprising:

an image forming unit configured to form an image on a recording material; and the heating device according to claim 1, wherein the heating device is configured to fix the image formed on the recording material.

* * * * *